United States Patent
Wilfert et al.

[11] 3,820,834
[45] June 28, 1974

[54] ARRANGEMENT OF BUMPER FOR VEHICLES

[75] Inventors: Karl Wilfert, Gerlingen-Waldstadt; Bela Barenyi, Maichingen, both of Germany

[73] Assignee: Daimler-Benz Aktiengesellschaft, Stuttgart-Untertuerkheim, Germany

[22] Filed: Feb. 1, 1972

[21] Appl. No.: 222,567

[30] Foreign Application Priority Data
Feb. 2, 1971 Germany.......................... 2104797

[52] U.S. Cl. ................................... 293/75, 293/84
[51] Int. Cl. ............................................. B60r 19/08
[58] Field of Search ............................. 293/74–78, 293/79, 85, 86, 84

[56] References Cited
UNITED STATES PATENTS

| | | | |
|---|---|---|---|
| 1,224,817 | 5/1917 | Westover | 293/74 |
| 1,416,468 | 5/1922 | Hoffman | 293/74 |
| 1,435,728 | 11/1922 | Noonan | 293/74 |
| 1,589,549 | 6/1926 | Palmer | 293/74 |
| 1,792,157 | 2/1931 | Franke | 293/84 |
| 1,802,925 | 4/1931 | Olsen | 293/78 |
| 2,097,833 | 11/1937 | Daily | 293/74 |
| 2,222,404 | 11/1940 | Cookenboo | 293/74 |

FOREIGN PATENTS OR APPLICATIONS

| | | | |
|---|---|---|---|
| 265,832 | 7/1929 | Italy | 293/74 |
| 670,953 | 10/1964 | Italy | 293/86 |

Primary Examiner—M. Henson Wood, Jr.
Assistant Examiner—Robert Saifer
Attorney, Agent, or Firm—Craig and Antonelli

[57] ABSTRACT

An arrangement of a bumper for vehicles, especially for motor vehicles, which consists of three parts which are supported at the support frame of the vehicle by means of one or several springs; elements are provided between the support frame and the bumper which prestress these springs into an initial position corresponding to the normal position of the bumper.

33 Claims, 11 Drawing Figures

FIG. 6
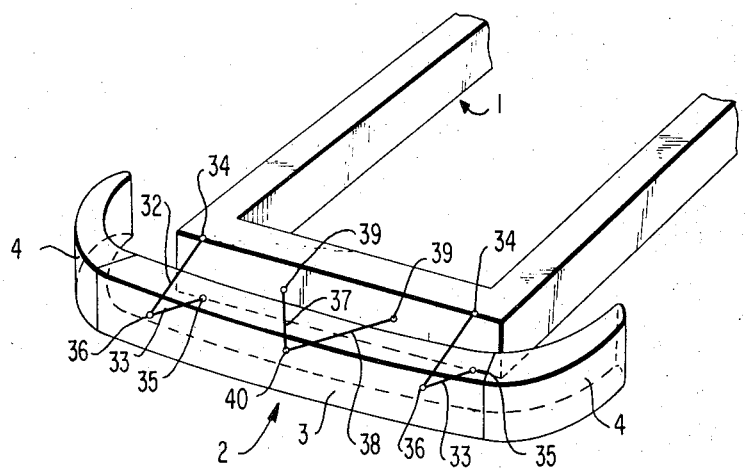
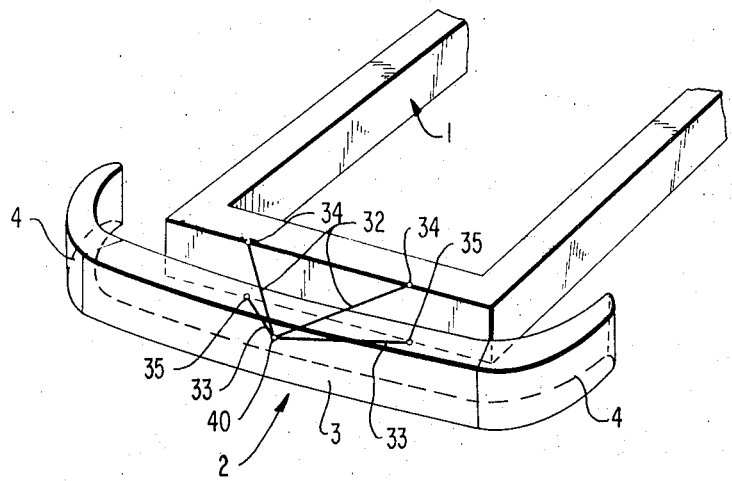
FIG. 7

ARRANGEMENT OF BUMPER FOR VEHICLES

The present invention relates to the arrangement of a bumper, especially at motor vehicles, which consists of three parts, which are supported at the vehicle frame of the motor vehicle or the like by means of one or several springs.

For example, an arrangement is described in the U.S. Pat. No. 2,954,256 in which a three-partite bumper is secured at the support frame of a vehicle by the interposition of a spring. The center part of this bumper is secured at angularly shaped mounting members between which extends a transversely disposed spring. The lateral parts of the bumper rigidly connected with the center part are supported at this spring by way of elastic members.

Therebeyond, other types of constructions are known in the prior art in which bumpers are secured at the support frame by means of springs or other elastic members. These known types of construction are all only capable to absorb sufficient forces at the spring elements if a sufficient deformation path is available to these spring elements. This means that the bumper has to be arranged in front of or to the rear of the support frame with a relatively large overhang or projection. This large overhang or projection leads, however, to the undesirable side effect that the bumper during the operation of the vehicle carries out considerable vibrations.

The present invention is concerned with the task to enable an elastic arrangement of a bumper which is capable of absorbing elastically relatively high forces without involving the danger of excessive vibrations. The present invention essentially consists in that stressing, tensioning, bracing or other suitable connecting elements prestressing the springs into a normal or initial position are mounted between the support frame and the bumper. As a result of this prestress, the forces to be absorbed by the springs can be accurately determined without requiring an excessively large overhang or projection of the bumper in relation to the support structure thereof. Already the reduction of the cantelever-like projection, especially in conjunction with the prestress brings about that vibrations with large amplitudes are precluded.

In one advantageous embodiment of the present invention, provision is made that the parts of the bumper are connected with each other by joints having vertical axes whereby the center part of the bumper corresponds approximately to the width of the end of the support frame structure. The significant advantage is achieved thereby that with every type of load on the bumper the danger is precluded that the ends of the bumper abut against the tires of the vehicle and damage the same.

In a further embodiment of the present invention, provision is made that the stressing or tightening elements are arranged on both sides of the vertical vehicle longitudinal center plane. It is thereby appropriate if, respectively, two stressing or tensioning elements are provided which are arranged one above the other. In order to further prevent the formation of vertical vibrations of the bumper, the fastening points of the stressing or tensioning elements arranged one above the other have a larger vertical spacing at the support frame than the fastening points at the bumper. In order to impede more strongly the formation of horizontal vibrations in a similar manner, the fastening points of the stressing or tensioning elements at the support frame are at a larger horizontal spacing than the fastening points of the stressing or tensioning elements at the bumper.

It is provided in a further advantageous embodiment of the present invention that shock absorbers extended in the end position serve as stressing or tensioning elements. Such tensioning or connecting elements also dampen possible vibrations.

In one advantageous embodiment of the present invention, the center part of the bumper is held by transversely extending leaf springs, preferably by two leaf springs extending transversely and arranged one above the other. These leaf springs possess the considerable advantage that they are far-reachingly rigid in the vertical direction so that an additional support can be dispensed with.

In a further advantageous embodiment of the present invention, provision is made that deformation members and/or abutment buffers or cushions are provided between the center part of the bumper and the support frame.

It will be advantageous in numerous cases if the stressing or tightening elements engage at the bumper in the joints. It is achieved thereby that no further pivotal connecting points have to be provided at the bumper.

Accordingly, it is an object of the present invention to provide a bumper arrangement, especially for motor vehicles, which avoids by simple means the aforementioned shortcomings and drawbacks encountered in the prior art.

Another object of the present invention resides in the arrangement of a bumper, especially at motor vehicles, which effectively prevents excessive vibrations thereof.

A further object of the present invention resides in a multi-partite bumper arrangement at a motor vehicle end which is springily supported with respect to the support frame structure yet involves no danger of tire damage in case of an impact deflection on the part of the bumper.

Still a further object of the present invention resides in a bumper arrangement of the type described above which is capable of absorbing relatively large forces, is devoid of any significant vibrations during the operation of the vehicle and is relatively simple in construction.

These and further objects, features and advantages of the present invention will become more apparent from the following description when taken in connection with the accompanying drawing which shows, for purposes of illustration only, several embodiments in accordance with the present invention, and wherein:

FIG. 6 is a schematic perspective view of a further bumper arrangement in accordance with the present invention; and FIG. 7 is a schematic perspective view, similar to FIG. 6, and illustrating a still further modified embodiment of a bumper arrangement in accordance with the present invention.

Figures 1A, 1B, 2A, 2B:
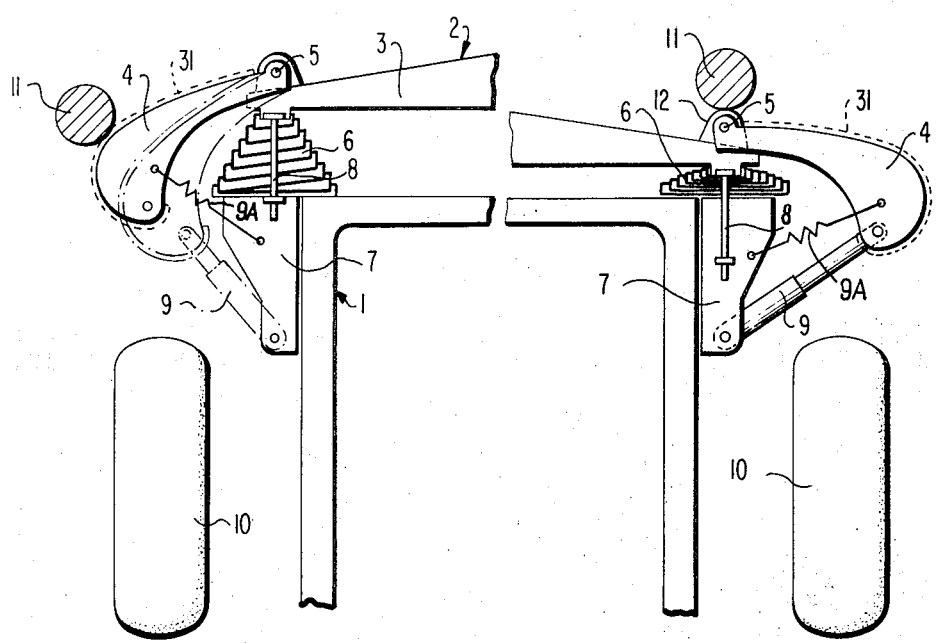
FIGS. 1a and 1b are partial plan views of a bumper arrangement in accordance with the present invention which is symmetrical with respect to the center line and which illustrate the left half in the normal extended position in FIG. 1a and the right half in the compressed condition in FIG. 1b.
FIGS. 2a and 2b are partial plan views of a modified embodiment of a bumper arrangement in accordance with the present invention again of symmetrical construction and illustrating the left half in the normal position in FIG. 2a and the right half in the compressed condition in FIG. 2b.

Referring now to the drawing wherein like reference numerals are used throughout the various views to designate like parts, and more particularly to FIGS. 1a and 1b, the front or rear end of the support structure, such as the support frame generally designated by reference numeral 1 of a motor vehicle, especially of a passenger motor vehicle, is schematically illustrated in these figures. A bumper generally designated by reference numeral 2 is secured as a vehicle end member at this support frame 1. The bumper 2 consists of a center part 3 and of two side parts 4. The side parts 4 are connected with the center part 3 by way of joints 5 having vertical axes. The center part 3 is slightly larger than the width of the end of the support frame 1. The center part 3 is supported at its two ends within the area of the joints 5 at the support brackets 7 by way of conical springs 6 of conventional construction; the support brackets or lugs 7 are laterally secured at the support frame 1. The two conical springs 6 disposed symmetrically to the vehicle longitudinal center plane are prestressed by the tie-rods 8 into the normal or initial position illustrated in FIG. 1a. The two side parts 4 of the bumper 2 are also supported at the support brackets 7 by means of spring elements, not illustrated in detail, for example, by conventional coil springs 9A. These spring elements 9A are prestressed by shock absorbers 9 which are secured at the outer ends of the lateral parts 4 and at the support brackets 7 whereby the shock absorbers 9 assume their fully extended position. The springs 9A may be constructed together with the shock absorbers 9, for example, into a single structural unit.

The arrangement of the bumper 2 illustrated in FIGS. 1a and 1b permits the absorption of relatively high elastic forces without requiring that the bumper 2 be arranged at an excessively large distance with respect to the end of the support frame 1 and without the danger of strong vibrations on the part of the bumper 2. This results, on the one hand, from the use of the conical springs 6 and on the other, by the application of a prestress onto these conical springs 6. Therebeyond, it is achieved that the danger is eliminated by this arrangement of the bumper 2 that in case of a yielding of the bumper 2 the lateral parts 4 abut against the tires 10 disposed laterally of the support frame 1.

If the vehicle drives against an obstacle 11 with one of the lateral parts 4 of the bumper 2, as is illustrated for example in FIG. 1a, then the (left) lateral part 4 is displaced into the position illustrated in dash line whereby it carries out a pivot movement about the joint 5. The shock absorber 9 and the spring 9A are thereby compressed.

If the center part of the bumper 2 impinges against an obstacle 11, (FIG. 1b), for example, within the area of the joint 5, which is surrounded by a bumper horn 12 of conventional construction, then the center part 3 is pushed in against the effect of the conical spiral springs 6. The shock absorber 9 extending obliquely to the vehicle longitudinal direction, which together with a spring 9A supports the lateral part 4 in the outward direction, is not displaced during such a load so that again a movement in the joint 5 occurs without causing the lateral part 4 of the bumper 2 to approach the tire 10.

In the embodiment according to FIGS. 2a and 2b, the support frame 1 is provided at its forward or rearward end with a bumper 2 in a manner corresponding to the embodiment according to FIGS. 1a and 1b, which bumper consists of a center part 3 and the two lateral parts 4 which are connected with each other by joints 5. The outer ends of the lateral parts 4 are supported at a support bracket 13 like in the embodiment according to FIG. 1 by way of springs 9A and shock absorbers 9 directed outwardly at an inclination to the vehicle longitudinal direction; the support bracket 13 is again laterally secured at the support frame 1.

The center part 3 of the bumper 2 is supported with respect to the support frame 1 by a transversely disposed leaf spring 14 whose ends are connected with the center part 3 in the joints 5. The leaf spring 14 is held in two mountings 15 disposed symmetrically to the vehicle longitudinal plane and is prestressed by stressing or tensioning elements 16 into a normal position and therewith up to a predetermined force. The stressing or tensioning elements 16 are mounted between the support bracket 13 and the joints 5. In this embodiment of the present invention, cables, steel bands or the like may be provided as stressing or tensioning elements 16.

If with this embodiment an obstacle 11 impinges against a lateral bumper part 4 as indicated in the FIG. 2a in dash lines, then the lateral part 4 is pivoted about the joint 5 whereby the spring 9A and the shock absorber 9 are compressed. If an obstacle 11 impinges against the center part 3, as is illustrated in the right half of FIG. 2, then the leaf spring 14 is deformed with the absorption of predetermined forces. Only the stressing or tensioning element 16 is thereby unstressed whereas the spring 9A and the shock absorber 9, which retain the lateral part 4 continue to remain stressed so that the lateral part 4 of the bumper 2 does not approach the tire 10.

Figure 3A:
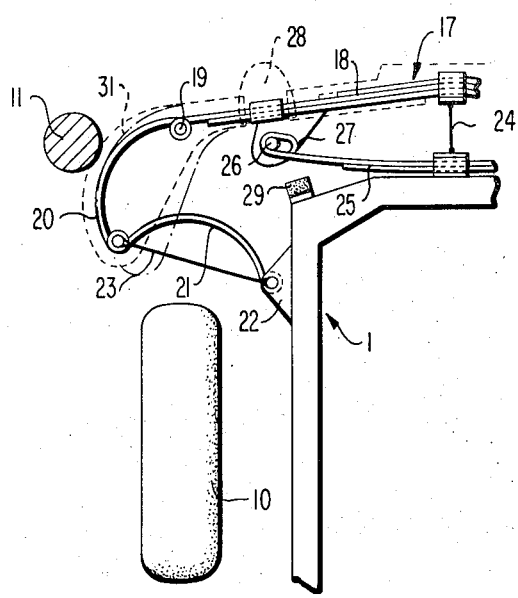
FIGS. 3a and 3b are partial plan views of a still further modified embodiment of a bumper arrangement in accordance with the present invention which is of symmetrical construction and illustrating the left half in the normal position in FIG. 3a and the right half in the compressed condition in FIG. 3b.
Figure 3B:
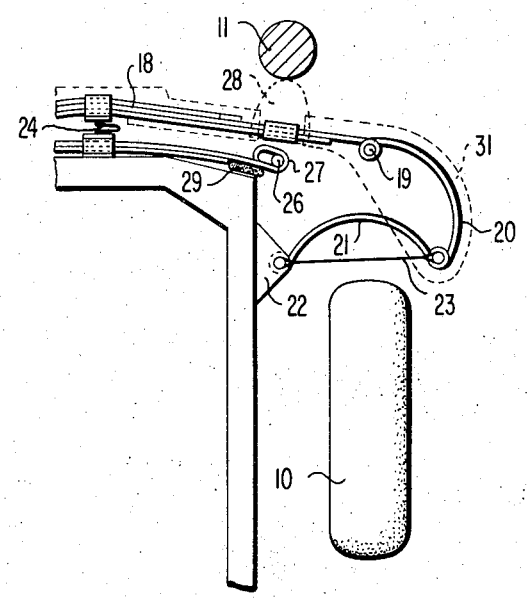

In the embodiment according to FIGS. 3a and 3b, the front or rear end of the support frame 1 of a motor vehicle is provided with a bumper generally designated by reference numeral 17 which in this embodiment is constructed as leaf spring. The bumper 17 consists of a center portion 18 constructed as leaf spring and of two lateral portions 20 adjoining the same by way of joints 19 which are constructed as curved spring members. The lateral portions 20 of the bumper 17 are connected with support brackets or lugs 22 mounted laterally at the support frame 1 by way of curved spring members 21 curved in the opposite direction. In addition to the curved spring members 21, stressing or tensioning elements 23 are provided between the support brackets 22 and the lateral portions 20 which can be constructed as cable or tensioning bands and which prestress the curved spring members 21 to a predetermined force. The center portion 18 of the bumper 17 constructed as leaf spring is retained in the vehicle longitudinal center plane by a stressing or tensioning element 24, for example, by a cable or a steel band and is prestressed preferably to a predetermined value. It is supported at the support frame 1 by way of a leaf spring 25 also held in the vehicle longitudinal center plane, which is arranged transversely and is constructed somewhat larger than the width of the support frame 1. The ends of the leaf spring 25 are connected with the center portion 18 by way of bolts 26, whereby the bolts 26 are inserted into elongated spring eyes 27. The stressing or tensioning element 24 which pulls the center portion 18 of the bumper 17 toward the support frame 1 imparts a predetermined prestress to the leaf spring 25.

If the vehicle hits with the bumper 17 an obstacle 11 by means of its lateral portion 20, as illustrated in FIG. 3a, then only this lateral portion 20 is pivoted about the joint 19 having a vertical axis relative to the vehicle longitudinal center plane whereby the curved spring member 21 is stressed. If the bumper 17 hits with its center portion 18 against an obstacle 11, for example, within the area of its bumper horn 28, then the leaf spring 25 is bent which in its end position abuts against an abutment cushion or buffer 29 of any conventional construction that is secured at the support frame 1. Since the curved spring 21 is not compressed or stressed thereby, movement occurs in the joint 19 between the center portion 18 and the lateral portion 20 so that the latter cannot abut against the tires 10.

Figure 4:
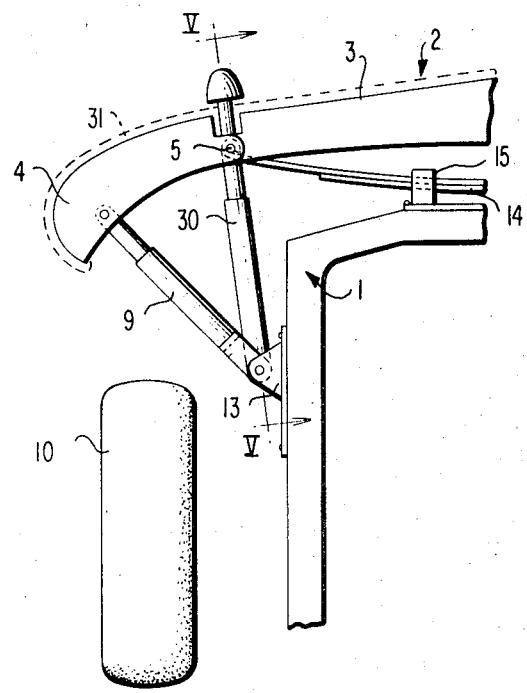
FIG. 4 is a plan view of one half of a further modified embodiment of a symmetrically constructed bumper arrangement in accordance with the present invention.
Figures 5A, 5B:
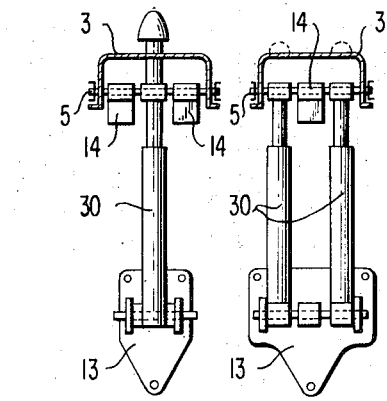
FIG. 5a is a somewhat schematic cross-sectional view taken along line V—V of FIG. 4.
FIG. 5b is a somewhat schematic cross-sectional view taken along line V—V of FIG. 4 and illustrating a modified embodiment.

An embodiment of the present invention is illustrated in FIG. 4 and in the cross sectional views according to FIGS. 5a and 5b which essentially corresponds to the embodiment according to FIG. 2. In order to prestress the leaf spring 14 into its normal position, a shock absorber 30 is provided as stressing or tensioning element between the end of the leaf spring 14 and the support bracket 13, which shock absorber is extended in its end position. If two leaf springs 14 arranged one above the other (FIG. 5a) are provided, which extend in the transverse direction, then provision is made that the shock absorber 30 engages between these leaf springs within the area of the joint 5 whereby the shock absorber 30 engages at the support bracket 13. If only one transversely disposed leaf spring 14 is provided (FIG. 5b) then appropriately two shock absorbers 30 are provided which are arranged one above the other and which extend respectively between the joint 5 and the support bracket 13. A favorable force distribution is always obtained by such arrangement.

In all embodiments of the present invention, both the center portion 3 or 18 as also the lateral portions 4 or 20 of the bumper 2 or 17 are armored with an elastic profile or sectional member 31 of any appropriate conventional construction.

In particular, transversely disposed leaf springs are suited for the arrangement of a bumper 2 or 17 in accordance with the present invention since these leaf springs can be regarded far-reachingly as rigid in the vertical direction so that an additional vertical support of the bumper can be dispensed with without having to fear vibrations in this direction.

If other types of springs are to be used, for example, cylindrical coil springs or rubber springs or the like, then the stressing or tensioning elements are arranged appropriately corresponding to the embodiments illustrated in FIGS. 6 and 7 whereby vibrations in the vertical and in the horizontal direction of the bumper are prevented far-reachingly by these arrangements of the stressing or tensioning elements. In the embodiment according to FIG. 6, the bumper 2 constructed, for example, in the manner illustrated in FIGS. 1 or 2 is supported at the support frame 1 by way of springs in a manner not illustrated further. The bumper 2 consists also in this embodiment of a center portion 3 which is pivotally connected with the two lateral portions 4 in a manner not illustrated further. In order to support the bumper 2 with vertical force components, two stressing or tensioning elements 32 and 33 are provided symmetrically to the vehicle longitudinal center plane which are secured at securing points 34 and 35 disposed one above the other at the front or rear cross bearer of the support frame 1. The stressing or tensioning elements 32 and 33 extending in the vehicle longitudinal direction, in contradistinction thereto, are secured at the center portion 3 of the bumper in a common securing point 36 approximately at the height of its center. Since the vertical distance of the fastening points 34 and 35 of the stressing or tensioning elements 32 and 33 is larger than the distance of their fastening points at the center part 3 of the bumper 2, which coincide in the securing point 36 in the illustrated embodiment, vertical force components result in the stressing elements 32 and 33 which prevent vertical vibrations.

In order to prevent horizontal vibrations, two additional stressing or tensioning elements 37 and 38 are provided in the embodiment according to FIG. 6 which are mounted at the support frame 1 at two fastening points 39 disposed symmetrically to the vehicle longitudinal center plane and having a horizontal spacing. In contradistinction thereto, the additional stressing or tensioning elements 37 and 38 have only one securing point 40 at the center portion 3 of the bumper 2, which is disposed in the vehicle longitudinal center plane and approximately in the vertical center of the center portion 3 of the bumper 2. The stressing or tensioning elements 37 and 38 thus receive horizontal force components which prevent a vibration in the transverse direction.

The same results are obtained with the embodiment according to FIG. 7, whereby, however, the stressing or tensioning elements 37 and 38 are dispensed with. For that purpose the securing points 36 of the stressing or tensioning elements 32 and 33 of FIG. 6 are shifted toward the vehicle longitudinal center plane so that they now lie in the single securing point 40. As a result thereof, the stressing or tensioning elements 32 and 33 receive horizontal as well as vertical force components. Cables, steel bands, tie-rods or preferably shock absorbers may be used as stressing or tensioning elements 32, 33, 37 and 38.

While we have shown and described several embodiments in accordance with the present invention, it is understood that the same is not limited thereto but is susceptible of numerous changes and modifications as known to those skilled in the art and we, therefore, do not wish to be limited to the details shown and described herein but intend to cover all such changes and modifications as are encompassed by the scope of the appended claims.

What we claim is:

1. A bumper arrangement for a vehicle comprising:

a plurality of bumper parts positioned adjacent an end of the vehicle for accepting collision forces at said end of the vehicle, joint means connecting said bumper parts to one another such that said bumper parts are movable separately from one another in response to collision forces acting thereon, spring support means connecting said bumper parts to relatively rigid support structure provided on the vehicle, and stressing means interposed between said bumper parts and said support structure for prestressing said spring support means with a normal bumper support position, said spring support means including at least one spring means engaging at both the support structure and spring connection means fixed to one of said bumper parts in such a manner that said spring connection means and said one of said bumper parts may move toward said support structure against spring forces of said spring means in other than a single linear direction, whereby all force components of oblique collision forces at said one of said bumper parts may be resiliently absorbed by said spring means, wherein said bumper parts include a center portion and two end portions pivotally connected one each to opposite ends of said center portion by joint means having substantially vertical pivot axes, wherein said spring support means includes separate spring means for each of said bumper parts which extend from said support structure directly to respective ones of said bumper parts, and wherein the spring means which extend from said end portions are connected at said support structure at positions longitudinally spaced from respective connection points between the support structure and the spring means extending from the center portion.

2. An arrangement according to claim 1, wherein the center portion extends laterally a distance corresponding approximately to the width of the support structure.

3. An arrangement according to claim 2, characterized in that the stressing means are arranged symmetrically on both sides of the vertical vehicle longitudinal center plane.

4. An arrangement according to claim 3, characterized in that two tensioning elements forming part of the stressing means are provided arranged one above the other.

5. An arrangement according to claim 4, characterized in that the securing points of the tensioning elements at the support structure have a larger spacing than the securing points thereof at the bumper.

6. An arrangement according to claim 3, characterized in that the securing points of the stressing means at the support structure are disposed at a larger horizontal distance than the securing points of the stressing means at the bumper.

7. An arrangement according to claim 2, characterized in that the spring means extending from the center portion includes transversely extending leaf spring means.

8. An arrangement according to claim 7, characterized in that said leaf spring means includes two leaf spring means provided at a distance one above the other.

9. An arrangement according to claim 7, characterized in that at least one of deformation means and abutment buffer means is provided between the center portion of the bumper and the support structure.

10. An arrangement according to claim 9, characterized in that both deformation means and abutment buffer means are provided between the center portion of the bumper and the support structure.

11. An arrangement according to claim 9, characterized in that said stressing means engage in the joint means of said bumper parts.

12. An arrangement according to claim 11, characterized in that the bumper parts only consist of the three parts formed by said center portion and the two end portions.

13. An arrangement according to claim 1, characterized in that the stressing means are arranged symmetrically on both sides of the vertical vehicle longitudinal center plane.

14. An arrangement according to claim 1, characterized in that two tensioning elements forming part of the stressing means are provided arranged one above the other.

15. An arrangement according to claim 14, characterized in that the securing points of the tensioning elements at the support structure have a larger spacing than the securing points thereof at the bumper parts.

16. An arrangement according to claim 1, characterized in that the securing points of the stressing means at the support structure are disposed at a larger horizontal distance than the securing points of the stressing means at the bumper parts.

17. An arrangement according to claim 1, characterized in that the spring means extending from the center portion includes transversely extending leaf spring means.

18. An arrangement according to claim 17, characterized in that said leaf spring means includes two leaf spring means provided at a distance one above the other.

19. An arrangement according to claim 1, characterized in that at least one of deformation means and abutment buffer means is provided between the center portion of the bumper and the support structure.

20. An arrangement according to claim 19, characterized in that both deformation means and abutment buffer means are provided between the center portion of the bumper and the support structure.

21. An arrangement according to claim 1, characterized in that said stressing means engage in the joint means of said bumper parts.

22. An arrangement according to claim 1, characterized in that the bumper parts only consist of three parts formed by said center portion and the two end portions.

23. An arrangement according to claim 1, wherein said stressing means includes separate stressing members for each of said spring means, each of said stressing members extending from said support structure directly to respective ones of said bumper portions.

24. An arrangement according to claim 23, wherein the center portion extends laterally a distance corresponding approximately to the width of the support structure.

25. An arrangement according to claim 1, wherein said center portion is a relatively rigid member, wherein said joint means are located at respective lateral outer ends of said center portion, wherein said spring means for said center portion include two conical springs spaced laterally from one another and engaging respective lateral outer end portions of said center portion, and wherein said stressing means includes two bolt means engageable one each with respective ones of said conical springs.

26. An arrangement according to claim 25, wherein said stressing members for each end portion include shock absorber means pivotally mounted at said support structure and at said end portions, the pivotal connection of said shock absorber means at said end portions being spaced from said joint means.

27. An arrangement according to claim 23, wherein said stressing members for each said end portion include shock absorber means pivotally mounted at said support structure and at said end portions, the pivotal connection of said shock absorber means at said end portions being spaced from said joint means.

28. An arrangement according to claim 27, wherein said stressing members for said center portion includes tension members interconnecting the joint means with the pivotal connection of the shock absorber means at the support structure.

29. An arrangement according to claim 1, wherein said spring means for said center portion is a leaf spring which has opposite free ends attached to said center portion, wherein said stressing members for said center portion include tension members attached to said center portion and said leaf spring at positions spaced from the free ends of said leaf spring.

30. An arrangement according to claim 29, wherein said spring means for said end portions include curved spring members pivotally attached to respective outermost ends of said end portions and to said support structure.

31. An arrangement according to claim 1, wherein each of said bumper parts is a rigid member, wherein said stressing means for each of said end portion includes a shock absorber pivotally attached to both said end portion and said support structure, and wherein said stressing means for said center portion includes a pair of shock absorbers pivotally connected one each at respective opposite ends of said center portion and at said support structure at respective pivotal connections for the shock absorbers at the end portions and said support structure.

32. An arrangement according to claim 29, wherein said leaf spring is a flat spring having a length in a direction extending between said free ends, a width extending vertically, and a thickness extending horizontally and transverse to said length, said thickness being substantially less than said width such that said flat spring has rigidity in the vertical plane and flexibility in the horizontal plane.

33. An arrangement according to claim 30, wherein each of said leaf spring and curved spring members are flat springs having a width extending vertically and a thickness extending horizontally and transverse to the length thereof, said thickness being substantially less than said width such that said curved spring members and leaf spring have rigidity in the vertical plane and flexibility in the horizontal plane.

* * * * *